Patented Apr. 26, 1927.

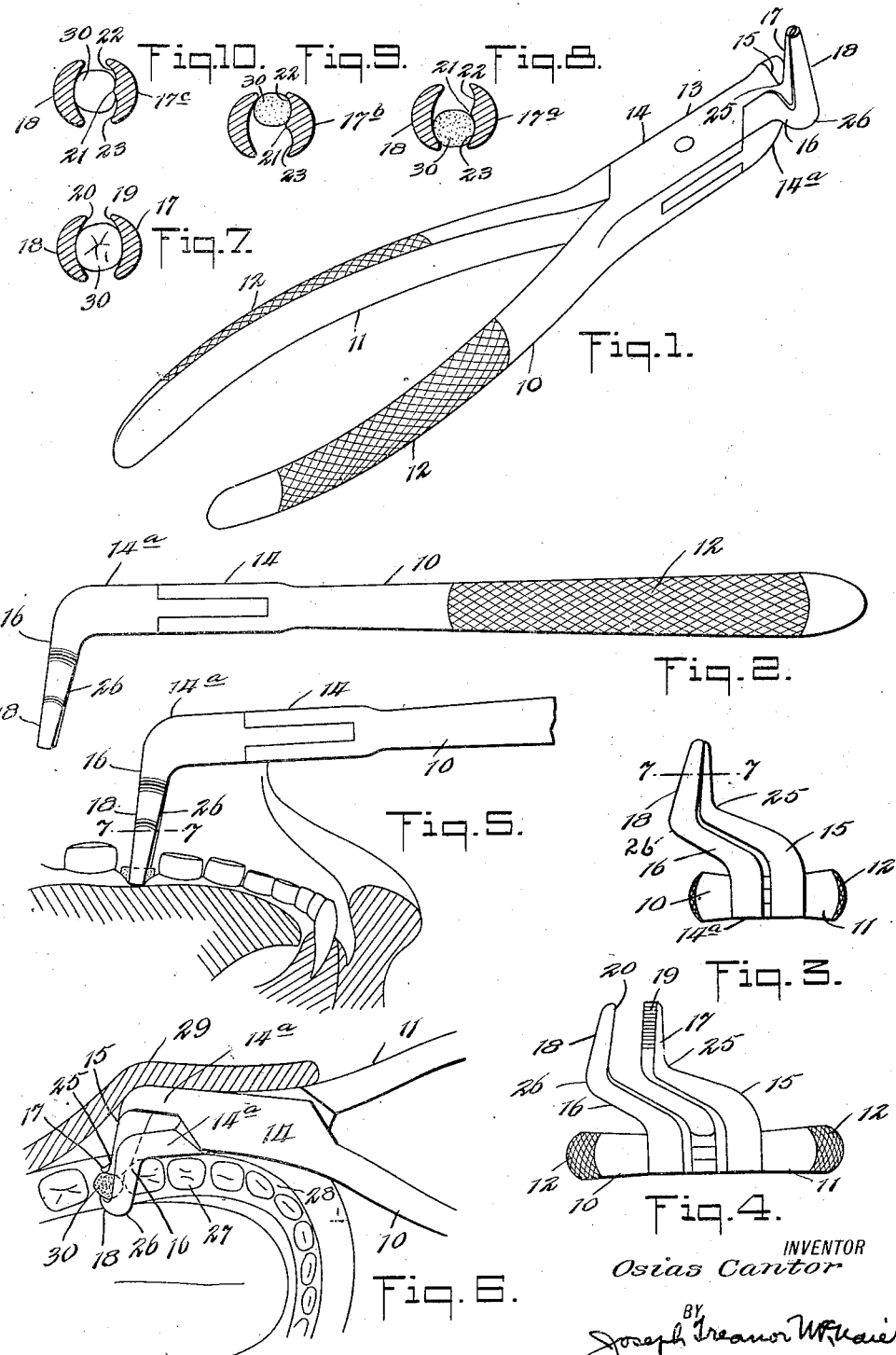

1,626,226

UNITED STATES PATENT OFFICE.

OSIAS CANTOR, OF SEA GATE, NEW YORK HARBOR, NEW YORK.

DENTAL FORCEPS.

Application filed August 20, 1925. Serial No. 51,344.

My invention relates to dental forceps and more particularly to forceps for use in extracting posterior roots or teeth embedded in the posterior gums or muscle formation around the alveolar processes of the mandible or jaw bone.

Still more particularly, my invention relates to forceps of this character having jaws and beaks, which are displaced laterally from the longitudinal axis of the forceps and extend downwardly from the pivoted portion of the forceps, so that the beaks are positioned to one side of the pivoted portion, enabling the body portion of the forceps to be so placed that the operator may have an unobstructed view of the root or tooth and may also more readily effect the extraction because of a leverage resulting from the lateral displacement of the jaws and their beaks.

In the present known art, it was necessary, when a posterior root or embedded posterior tooth was to be extracted, to use, either an instrument known as an "elevator" and displace the root or tooth by gouging, or to use forceps in which the jaws and beaks extended downwardly from the body portion in a line coincident with the horizontal axis of the forceps.

Extraction by means of the "elevator" was crude, painful, very unsatisfactory and frequently unsuccessful, except by repeated application of the instrument. Extraction by means of the heretofore known type of forceps has been likewise unsatisfactory and difficult. Difficulty in the use of the known type of forceps resulted from the fact that they were so constructed that the beaks and jaws thereof were substantially in line with the longitudinal axis of the forceps. When this instrument was used, the operator frequently was unable to properly apply the forceps because at the time of the operation, the body portion of the forceps to which the jaws were immediately attached greatly obstructed his view of the beaks and of the root or tooth to be extracted.

It has therefore frequently occurred that an operator has mistakenly extracted the wrong tooth, or root, because of his inability to have an unobstructed view and make a correct application of the operating instrument.

My invention is provided to overcome these and other defects found in forceps heretofore known for the extraction of posterior roots and posterior embedded teeth; and one object of my invention is, therefore, to provide a device of this character, which, when used, will permit the operator to have a substantially unobstructed view of the root or tooth to be extracted and to properly apply the gripping beaks of the forceps thereto.

Another object is, to provide a device of this character which shall have jaws and beaks displaced laterally from the longitudinal axis of the forceps, which shall extend downwardly from the body portion of the forceps and shall project slightly forwardly therefrom at a suitable angle, so that the operator may have an unobstructed view of the root or tooth and properly apply the forceps thereto, and which shall be so constructed, that the jaw carrying end of the forceps may be so placed that it will effect a substantially lateral displacement and distension from the gum, of the cheek or flesh portion of the face surrounding and adjacent the teeth and jaws, thereby adding to the operator's ability to have an unobstructed view of the operating point during the operation.

Another object is, to provide a device of this character, in which the jaws and beaks shall be so laterally displaced from the longitudinal axis of the forceps, that this displacement will provide a side leverage, by means of which the operation of extraction may be more readily accomplished.

Another object is, to provide a device of this character, that may be introduced into the mouth cavity at a substantial lateral angle to the face and laterally displace the flesh of the face surrounding the root or tooth so that complete vision of the tooth may be had during the operation, and which shall have the jaws so laterally displaced from the longitudinal axis of the forceps that the beaks thereof may be readily and properly applied to the tooth or root, while the flesh of the face remains displaced.

Another object is, to provide a device of this character which when the jaws thereof are applied to the root or tooth to be extracted, will leave the remaining teeth free of contact with the forceps and the forceps so positioned as to leave an unobstructed view of the root or tooth to be extracted.

Another object is, to provide a device of this character in which the beaks of the forceps are rotarily twisted in reference to the jaws carrying them, so that the inner faces of the beaks shall lie at a lateral angle to the longitudinal axis of the forceps, to secure a proper grip thereof at substantially diametrically opposite points upon the tooth or root, when the forceps are introduced into the mouth at a lateral angle to the face.

Another object is, to provide a device of this character having the inner faces of the beaks of such formation that they will grip the tooth or root at substantially diametrically opposite surface points, irrespective of variations in the lateral angular position at which the forceps are introduced into the mouth cavity and applied.

Another object is, to provide a device of this character which shall be of few parts, of simple and unitary construction, of cheap manufacturing cost, which may be efficient in operation, which will minimize the likelihood of mistakes in extracting posterior roots and embedded teeth and which may have other advantages and results not herein specifically set forth, but which may appear in the following specification.

My invention consists in the particular construction, combination, organization and arrangement of parts shown in the accompanying drawings, described in the following specification and more particularly defined in the appended claims.

In the drawings:

Fig. 1 is a perspective view of my forceps in closed position, showing the angular displacement of the jaws and the extension of the jaws and beaks from the body portion.

Fig. 2 is a side view of my forceps, showing the beaks and the jaws downwardly extending from the body portion of the forceps and forwardly projecting therefrom.

Fig. 3 is an end view of my forceps in closed position, showing the lateral displacement of the jaws and beaks from the longitudinal axis of the forceps.

Fig. 4 is an end view, similar to Fig. 3 with the forceps open, showing the lateral displacement of the jaws and beaks in reference to the longitudinal axis of the forceps and the relative positions of the jaws and beaks when the forceps are opened.

Fig. 5 is a view, partly in vertical section, showing a portion of the jaw and positioned teeth, with my forceps applied to a root to be extracted, illustrating its position on the root and its relation to the mouth and other teeth therein.

Fig. 6 is a plan view, partly in horizontal section, showing the forceps applied as in Fig. 5, illustrating the cheek displaced laterally from the jaw and showing the position of the body portion, jaws and beaks of the forceps as applied to the root and their relation to the other teeth.

Fig. 7 is an enlarged transverse sectional view taken on line 7—7 of Fig. 3, showing the concave formation of the inner faces of the beaks applied to a tooth or root.

Fig. 8 is an enlarged transverse sectional view, similar to Fig. 7, showing a modified form of one of the beaks, having an intermediate rib extending longitudinally thereof and with a concave portion on either side of said rib, a tooth or root to be extracted being engaged in one of the concave portions.

Fig. 9 is a view similar to Fig. 8, showing a tooth or root engaged by a concave portion shown in Fig. 8 as vacant.

Fig. 10 is an enlarged view of Fig. 8, showing a root or tooth engaged by the longitudinal rib and the concave inner face of the opposite beak.

Referring to the drawings, in which like numerals of reference indicate corresponding parts, my device consists of a pair of handles 10 and 11, which are of the usual character for forceps of this general type and which are provided near one end with serrated or knurled surfaces for a portion of their length, to insure a firm grip of the handle by the operator. The handles 10 and 11 extend forwardly, and are operatively joined by the pivot 13, so that they may turn thereon and operate the forceps in the usual manner. The forward end portion of the handles surrounding the pivot joint 13 is formed in a rectangular shaped body portion 14 substantially similar to this part of other instruments of this general character. The box like body portion 14 is integral with the handle portions 10 and 11.

At their outer ends, the handles 10 and 11 are provided with a pair of co-operating jaws 15 and 16, which are preferably integral with the handles 10 and 11, and the portions thereof which form the box like rectangular body portion 14. The jaws 15 and 16 are angularly disposed, in reference to the outer ends of the handles 10 and 11, and in reference to the box like body portion 14 formed thereby. The jaws 15 and 16 are substantially similar in contour and outer formation and are arranged substantially parallel, so that they may close upon each other, or be opened from each other by the operation of the handles 10 and 11.

Integral with the jaws 15 and 16, and formed by what is substantially a continuation and extension to each thereof, are beaks 17 and 18. These beaks are of substantially similar shape and are so disposed upon the jaws and in reference to each other that they open with the opening of the jaws, and close upon and contact with each other at their inner faces, upon the closing of the jaws. The beaks 17 and 18, are, on their inner contacting faces provided with concave or hollowed out portions that are knurled, serrated, or ridged and which are adapted to approximately conform to the shape of a tooth or root when applied thereto, and securely grip and hold the same for extraction. These beaks 17 and 18 may be provided with concave surfaces shown in Fig. 7, as substantially identical on each beak, but I may provide one jaw with a modified form of beak such as is illustrated in Figs. 8, 9 and 10, on jaws 17ª, 17ᵇ and 17ᶜ, in the respective figures. The modification illustrated in Figs. 8, 9 and 10, shows a ridge 21, intermediate opposite ends of the beaks 17ª, 17ᵇ and 17ᶜ, which extends a suitable distance the length of these beaks. On either side of the ridge 21 concave portions 22 and 23 are provided, which extend longitudinally of the beak, in correspondence substantially with the ridge 21. The beaks 17 and 18, at the point where the ends are angularly disposed from the jaws 15 and 16, are similarly rotarily twisted. This results in causing the line in which their contacting inner end faces lie to be at a slightly acute angle to the longitudinal axis of the forceps, with the open divergent end of the angle toward the rearward or handle end of the forceps. In a left hand forceps, or a forceps for extraction from the left side of the jaw, such as is illustrated in the drawings, this divergent end would be to the left of the forceps handle.

The jaws 15 and 16 extend downwardly from the outer ends of the handles and the box like portion 14 formed thereby and also extend similarly, laterally to one side of this box like portion 14 and the longitudinal axis of the forceps. The beaks 17 and 18 joined to and being substantially a part of the jaws, are at the junctions 25 and 26 bent at substantially right angles to these ends of the jaws and extend therefrom downwardly. The jaws 15 and 16 with the beaks 17 and 18 carried thereon, extend from the outer ends of the handles 10 and 11 and from the body portion 14 formed thereby, at a slight forwardly disposing angle to this body portion 14, so that the lower end of the beaks 17 and 18 are slightly advanced beyond the end of the body portion 14, beyond the end of the jaws 15 and 16, and form the most forward end of the forceps. The angle of forward projection, in relation to the body portion 14, in which the jaws 15 and 16 and the beaks 17 and 18 are disposed, is preferably about 15 degrees beyond the right angle. But I may increase or decrease the forward projection of the beaks and jaws, in reference to the body portion 14, to any desired extent, or may position the jaws and beaks, in reference to the body portion 14, so that they are at a direct right angle thereto.

The lower ends of the beaks 17 and 18 are drawn to a suitably sharp edge, so that they may be forced into the gum or muscle tissue surrounding the tooth, if necessary, in order that the beaks 17 and 18 may securely grip and hold the posterior root or tooth and reduce the necessity of lancing to a minimum.

In applying my instrument to extract a posterior root or embedded tooth, the jaw carrying end of the forceps is inserted into the mouth in a sidewise direction, or at a lateral angle. The body portion 14 is held to the side of the jaw, between the tooth 27 and gums 28 and the cheek or side of the face 29. In this relative position to the jaw and cheek it is thrust backwardly into the mouth, so that the beaks 17 and 18 can be placed upon and grip the root 30. The forceps are inserted into the mouth in the manner above described, with the handles thereof slightly depressed, and the beaks are caused to securely grip the root 30 or tooth to be extracted.

It will be seen, that because the jaws and beaks project at an angle from the body portion 14 of the forceps, greater than a right angle, an operator is able to introduce the instrument in place with the handles depressed and thereby keep it free from contact with other teeth and prevent his vision of the root or tooth from becoming obstructed. It will also be seen that, because the jaws 15 and 16, with the beaks 17 and 18, are offset laterally from the longitudinal axis of the forceps and from the body portion 14, the portions 14ª of the forceps jaws and the body portion 4, which would otherwise obstruct the vision of the operator and prevent him from properly placing the beaks upon the tooth or root, are, by the construction of my device, disposed at one side of the teeth and gums and offer no obstruction to the vision of the root to be extracted. It will be seen further that the body portion 14 and the portions 14ª of the jaws, so displace the cheek 29 that the operator can clearly see the root or embedded tooth to be extracted and properly and conveniently apply his forceps thereto.

Since the forceps are introduced into the mouth at a lateral angle to the jaw and since it is desirable that the beaks shall grip the root or embedded tooth at substantially diametrically opposite points, I have twisted the beaks 17 and 18, at the points 25 and 26, in reference to the jaws 15 and 16, so that the line of the inner faces of the beaks 17 and 18 will lie at an angle to the longitudinal axis of the forceps. The beaks will thus be positioned as desired upon the root and this twist will compensate for the lateral position of the handle when the forceps are introduced into the mouth. If the beaks were not thus twisted, when the instrument was introduced into the mouth in the angular manner above referred to, the jaws would not grip the teeth on the substantially diametrically opposite points desired, but would so grip the teeth that when pressure was exerted upon the handles there would be a tendency to squeeze the jaws from the tooth or root and effect an undesired displacement of the instrument therefrom.

In the form of beaks shown in Fig. 7, in which the inner faces thereof are of similarly concaved form, the root or tooth 30 is gripped in the manner illustrated in that figure. In the Figs. 8, 9 and 10, wherein there is shown the beaks 17$^a$, 17$^b$ and 17$^c$, having an intermediate ridge 21 with concave portions 22, 23, on either side thereof, it will be seen that the tooth 30 is illustrated in the Fig. 8 as engaged in one concave portion 23, adjacent the ridge 21, while in Fig. 9 the tooth 30 is shown engaged in the other concave portion 22, adjacent the ridge 21, while in Fig. 10 the tooth 30 is shown engaged between the beak 18 and the ridge 21 on the beak 17$^c$. These Figs. 8, 9 and 10, show the manner in which this modification in form of the beaks may be utilized to grip and securely hold the teeth or roots of various conformations during an operation or may grip and securely hold teeth of the same conformation when the forceps are introduced into the mouth at various angles, to effect an extraction. Due to the fact that immediately at and below the gum, or tissue overlaying the jaw bone, the tooth decreases in diameter rapidly and sharply toward the root end, the provision of the ridge portion 21 in the modified form illustrated in Figs. 8, 9 and 10 results, in a firmer grip of the tooth and a surer hold thereof. When the beaks are tightened thereon, the sudden decrease in size of the tooth results in automatically forcing the beaks downwardly upon the root and into the gum and prevents unintended displacement of the beaks therefrom.

It will be obvious, that since my device has jaws and beaks projecting downwardly and forwardly at an angle from the body portion 14, and laterally from the longitudinal axis, and extending downwardly, to terminate in beaks angularly disposed to the jaws, my forceps may be laterally introduced into the mouth, engage the root or tooth, securely hold it against displacement therefrom, and that during the introduction and application of the forceps to the root or tooth, the operator has unobstructed vision and may properly apply the instrument so that unintended extractions will not occur, and prevent other injuries to the gums and teeth which have resulted from the use of forceps previously known.

It is further evident that beside the visibility resulting from the peculiar disposition of the jaws and beaks of my forceps that the operation of extraction is greatly facilitated. This results partially from the fact that, when the forceps beaks have been positioned and closed upon the root or tooth and given a slight rotary twist, the operator may then more readily extract the tooth by my forceps than by forceps heretofore known, because of the lateral leverage which results from displacing the beaks and jaws in reference to the longitudinal axis of the forceps. There is an additional facility to "lift," resulting from this lateral dispositon of the jaws and beaks when the forceps have been applied to the root of the tooth and the operation is performed. It requires but a comparatively slight effort, by the operator, with this leverage, to perform an extraction, whereas by instruments heretofore known the operation frequently required the exercise of considerable strength.

I have, further, provided an instrument by which posterior roots or embedded teeth may be extracted with a minimum of effort, which is of such construction that displacement of the applied instrument is reduced to a minimum, that permits visibility by the operator, of both the gripping beaks of the instrument and of the tooth or root to be gripped at all times during the operation and which is constructed so as to be free from contact with teeth or roots not intended to be extracted, which displaces the cheek from the root or tooth to be extracted, to give added vision to the operator and which overcomes many defects found in instruments known heretofore for extractions and use of this character.

Although, the foregoing description has related to forceps applicable to the left side of the jaw, yet, it will be understood my invention, is not confined to devices of this particular construction. Extractions on the right side require that the disposition of the jaws and beaks must project from the opposite side of the body portion 14. These may be termed right hand instruments. In all other respects except as to the side of the forceps from which the jaws and beaks extend, the right and left hand instruments are substantially identical.

Although I have shown and described my device in detail, I do not wish to be limited thereby, except as the state of the art and the appended claims may require, for, it is obvious that various changes and modifications may be made in the combination, organization and arrangement of parts of my invention, without departing from the spirit and scope thereof.

What I claim as new and desire to secure by Letters Patent is:

1. Dental forceps comprising a pair of pivotally connected handles, a body portion formed intermediate the ends of said handles, adjacent said pivotal connection, a pair of substantially parallel jaws extending laterally and downwardly in a forwardly inclined plane from the forward end of said handles and said body portion, each jaw being formed with a beak, integral there-with, extending angularly downward therefrom in said forwardly inclined plane of the jaws and adapted to be actuated by said handles.

2. Dental forceps, comprising a pair of pivotally connected members, each having a handle and a jaw element, each of said jaw elements similarly extending downwardly from the body portion of the pivotally connected handles, projecting forwardly therefrom and from said body portion at an angle greater than 90° and being similarly disposed laterally from said members and said body portions relative to the longitudinal axis of said forceps; and a beak, integral with each of said jaw elements and of substantially similar formation, extending downwardly and angularly therefrom lying in the same plane with said jaw element and adapted to be actuated by said handles.

3. Dental forceps, comprising a pair of pivotally connected members, each having a handle and a jaw element, each of said jaw elements lying in the same plane extending downwardly from the body portion of the pivotally connected handles and angularly projecting forwardly therefrom in a plane below the plane of the body portion and similarly disposed laterally from said members and said body portion, relative to the longitudinal axis of said forceps, and substantially identical beaks, integral with said jaw elements, extending angularly and downwardly therefrom, having their inner faces lying in a vertical plane angularly disposed to the horizontal axis of said forceps, said jaw elements and beaks being adapted to be actuated by said handles.

4. Dental forceps, comprising a pair of pivotally connected members, each having a handle and a jaw element, each of said jaw elements lying in the same plane, extending downwardly from the body portion of the handles and angularly projecting forwardly therefrom and from said body portion, below the plane of said body portion and similarly disposed laterally from said members and said body portions relatively to the longitudinal axis of said forceps, and substantially similar beaks, integral with said jaw elements, extending angularly and downwardly therefrom, in the plane of the jaw elements, rotarily twisted in relation to said jaw elements so that their inner faces lie in a vertical plane angularly disposed laterally to the horizontal axis of said forceps, said jaw elements and beaks being adapted to be actuated by said handles.

5. Dental forceps, comprising a pair of pivotally connected members, each having a handle and a jaw element, each of said jaw elements lying in the same plane, extending downwardly from the body portion of the pivotally connected handles, angularly projecting forwardly therefrom and from said body portion below the plane of said body portion and similarly disposed laterally from said members and said body portion relatively to the longitudinal axis of said forceps, and substantially similar beaks, integral with said jaw elements, extending angularly and downwardly therefrom in the plane of the jaw members, twisted in relation to said jaw members so that their inner faces lie in a vertical plane, angularly disposed laterally to the horizontal axis of said forceps, said beaks being transversely concaved for a substantial portion of their length on their inner opposite faces, said jaw elements and beaks being adapted to be actuated by said handles.

6. Dental forceps, comprising a pair of pivotally connected members, each having a handle and a jaw element, each of said jaw elements lying in the same plane, extending downwardly from the body portion of the pivotally connected handles and angularly projecting forwardly therefrom and from said body portion below the plane of said body portion and similarly disposed laterally from said members and said body portions relatively to the longitudinal axis of said forceps, and substantially similar beaks, integral with said jaw elements extending angularly downwardly therefrom in the plane of the jaw members, rotarily twisted in relation to said jaw members, so that their inner faces lie in a vertical plane, angularly disposed laterally to the horizontal axis of said forceps, the inner face of one of said beaks having a transversely concaved section extending a substantial portion of its length and the inner face of the opposite beak having a plurality of transversely concave portions extending substantially the length of said beak, said last mentioned concaved portions being separated by a ridge disposed substantially midway the width of said beak, said jaw elements and beaks being adapted to be actuated by said handles.

7. Dental forceps, comprising a pair of pivotally connected members, each having a handle and a jaw element, each of said jaw elements lying in the same plane, extending downwardly from the body portion of the pivotally connected handles and angularly projecting forwardly therefrom and from said body portion below the plane of said body portion and similarly disposed laterally from said members and said body portions relatively to the longitudinal axis of said forceps, and substantially similar beaks, integral with said jaw elements, extending angularly, downwardly therefrom in the plane of the jaw elements, rotarily twisted in relation to said jaw elements, so that their inner faces lie in a vertical plane, angularly disposed laterally to the horizontal axis of said forceps, said beaks having substantially similarly transversely concaved gripping portions upon their opposite inner faces, said jaw elements and beaks being adapted to be actuated by said handles.

8. Dental forceps, comprising a part of pivotally connected members, each having a handle and a jaw element, each of said jaw elements lying in the same plane, extending downwardly from the body portion of the pivotally connected handles, angularly projecting forwardly therefrom and from said body portion below the plane of said body portion and similarly disposed laterally from said members and said body portion relative to the longitudinal axis of said forceps, and substantially similar beaks, integral with said jaw elements, extending angularly downwardly therefrom in the plane of the jaw elements, twisted relatively to said jaw elements, so that their inner faces lie in a vertical plane angularly disposed laterally to the horizontal axis of said forceps, said beaks having transverse, dissimilarly concaved gripping portions upon their inner opposite faces, said jaw elements and beaks being adapted to be actuated by said handles.

Signed at the city of New York in the county of New York and State of New York this 14th day of August, A. D. 1925.

OSIAS CANTOR.